(12) United States Patent
Gledhill, III et al.

(10) Patent No.: US 9,389,109 B2
(45) Date of Patent: Jul. 12, 2016

(54) INLINE ULTRASONIC TRANSDUCER ASSEMBLY DEVICE AND METHODS

(71) Applicant: Blue-White Industries, Ltd., Huntington Beach, CA (US)

(72) Inventors: Robert Gledhill, III, Huntington Beach, CA (US); John Nguyen, Fountain Valley, CA (US); Jason A. Woolard, Huntington Beach, CA (US); Darrell B. Freeman, Lakewood, CA (US)

(73) Assignee: Blue-White Industries, Ltd., Huntington Beach, CA (US)

(*) Notice: Subject to any disclaimer, the term of this patent is extended or adjusted under 35 U.S.C. 154(b) by 100 days.

(21) Appl. No.: 14/196,892

(22) Filed: Mar. 4, 2014

(65) Prior Publication Data

US 2014/0260664 A1 Sep. 18, 2014

Related U.S. Application Data

(60) Provisional application No. 61/785,615, filed on Mar. 14, 2013.

(51) Int. Cl.
| | | |
|---|---|---|
| *G01F 1/20* | (2006.01) | |
| *G01F 1/66* | (2006.01) | |
| *G01F 15/14* | (2006.01) | |
| *G01F 15/18* | (2006.01) | |

(52) U.S. Cl.
CPC ............... *G01F 1/662* (2013.01); *G01F 15/14* (2013.01); *G01F 15/18* (2013.01)

(58) Field of Classification Search
CPC ............... G01F 1/20; G01F 1/32; G01F 1/66; G01F 1/44

USPC ............... 73/861.18, 861.29, 861.22, 861.63, 73/861.27

See application file for complete search history.

(56) References Cited

U.S. PATENT DOCUMENTS

| | | | | |
|---|---|---|---|---|
| 4,425,803 A | * | 1/1984 | Baumoel | G01F 1/667 73/861.18 |
| 4,454,767 A | | 6/1984 | Shinkai et al. | |
| 4,704,907 A | | 11/1987 | Mannherz et al. | |
| 4,882,934 A | | 11/1989 | Leffert et al. | |
| 5,001,936 A | * | 3/1991 | Baumoel | G01F 1/662 73/861.18 |
| 5,037,546 A | | 8/1991 | Janczak et al. | |
| 5,131,278 A | * | 7/1992 | Baumoel | G01F 1/662 73/861.18 |
| 5,365,794 A | * | 11/1994 | Hussain | G01F 1/8409 73/861.357 |
| 5,597,962 A | * | 1/1997 | Hastings | G01F 1/662 374/E11.01 |
| 6,026,693 A | * | 2/2000 | Baumoel | G01F 1/662 73/861.27 |
| 6,308,580 B1 | * | 10/2001 | Crisfield | G01F 1/8409 73/861.355 |

(Continued)

*Primary Examiner* — Jewel V Thompson
(74) *Attorney, Agent, or Firm* — Knobbe, Martens, Olson & Bear LLP

(57) ABSTRACT

An inline ultrasonic transducer assembly is disclosed. The transducer assembly can include a body having a cylindrical flow passage and a transducer mounting space having a track on along which at least one transducer chassis can be slidingly engaged. The transducer chassis can include at least one piezo member oriented at an angle with the axial centerline of the flow passage.

19 Claims, 8 Drawing Sheets

(56) References Cited

U.S. PATENT DOCUMENTS

| | | |
|---|---|---|
| 6,883,386 B2 | 4/2005 | Osone et al. |
| 6,895,825 B1 | 5/2005 | Barkhoudarian |
| 6,959,601 B2 | 11/2005 | Sinha |
| 7,197,938 B2 | 4/2007 | Gysling et al. |
| 7,299,707 B1 * | 11/2007 | Evans ................ G01F 1/44 73/861.63 |
| 7,500,402 B2 | 3/2009 | Pors et al. |
| 7,624,651 B2 | 12/2009 | Fernald et al. |
| 7,963,176 B2 | 6/2011 | Pors et al. |
| 8,256,703 B1 | 9/2012 | Jefferson et al. |
| 8,820,175 B1 * | 9/2014 | Ahmed ................ G01F 1/688 73/861.04 |
| 2009/0255345 A1 | 10/2009 | Gysling |
| 2010/0307263 A1 | 12/2010 | Gysling et al. |
| 2012/0073384 A1 * | 3/2012 | Rieder ................ G01F 1/8418 73/861.355 |
| 2014/0260666 A1 * | 9/2014 | Brand ................ G01F 1/3218 73/861.22 |

\* cited by examiner

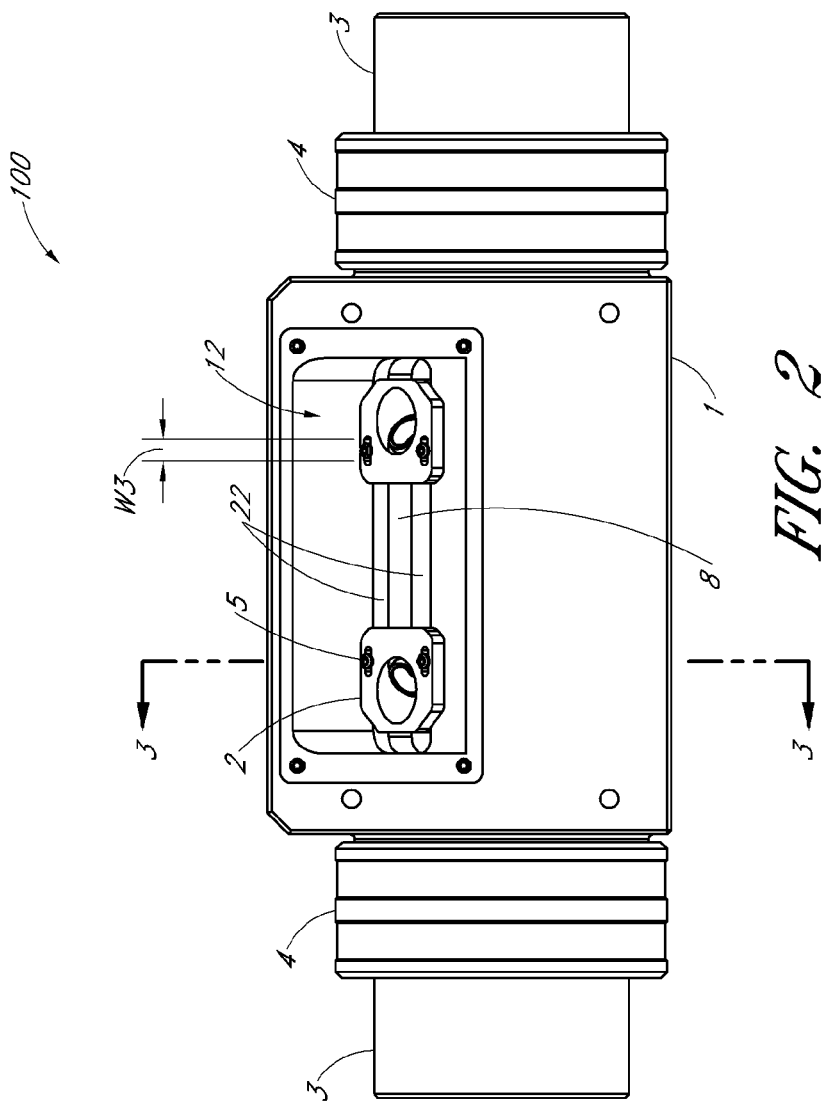
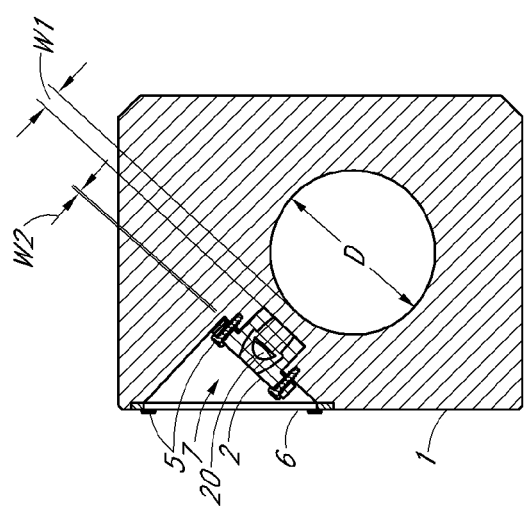

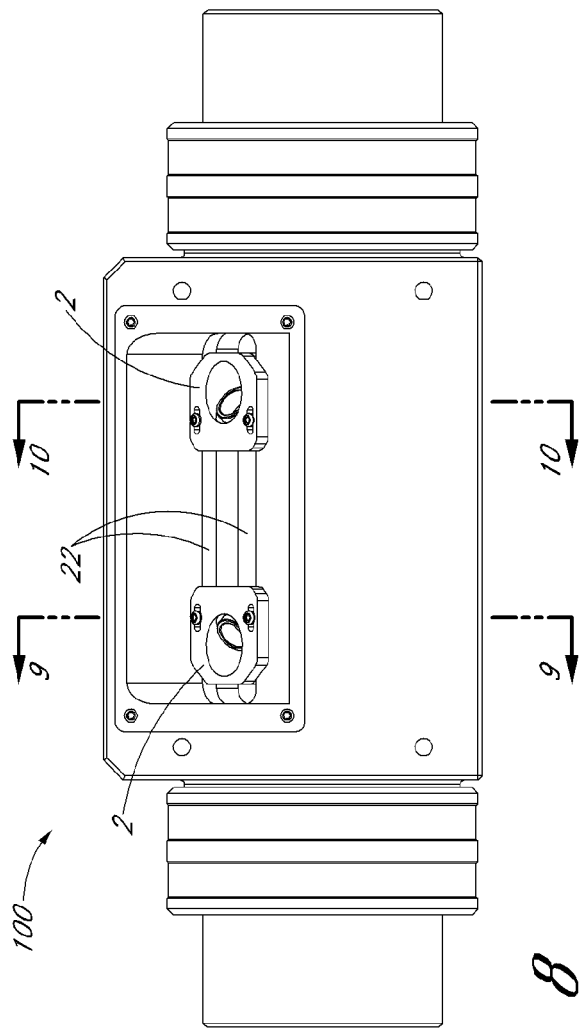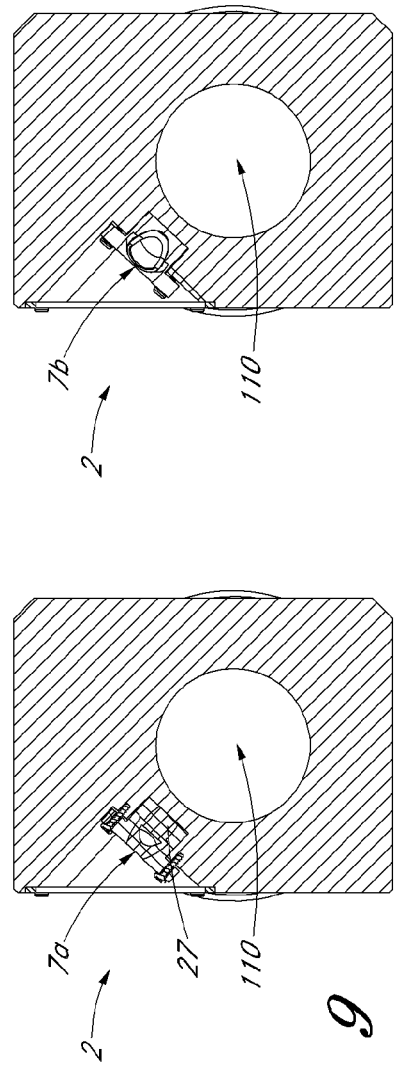
FIG. 8
FIG. 9
FIG. 10

INLINE ULTRASONIC TRANSDUCER ASSEMBLY DEVICE AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Patent Application No. 61/785,615, entitled "INLINE ULTRASONIC TRANSDUCER ASSEMBLY DEVICE AND METHODS," filed on Mar. 14, 2013 which is hereby incorporated by reference in its entirety.

FIELD OF THE DISCLOSURE

The present disclosure relates generally to ultrasonic transducer assemblies and in particular to a device and methods for installing and aligning a transducer assembly for an ultrasonic transducer assembly with a pipe or other fluid conduit.

DESCRIPTION OF THE RELATED ART

Many varieties of ultrasonic transducer assemblies exist, employing a variety of techniques and mechanisms for installing the transducer assemblies on a fluid conduit. However, such devices and certain components thereof have various limitations and disadvantages.

SUMMARY OF THE INVENTION

Traditionally, clamp-on transducers have been favored by ultrasonic flow meter manufacturers due to their one-size-fits-all transducer design that simplifies manufacturing and minimizes inventory. Clamp-on transducer type flow meters may be preferred because they have no moving parts, no wetted materials, and do not require a system shut-down for installation.

However, traditional clamp-on transducers require multiple installation details in order to operate correctly, such as: pipe material, pipe wall thickness, pipe inside diameter, pipe liner (if any), and fluid type. Furthermore, additional installation details are often difficult to obtain and detect, such as: the smoothness of the outer pipe wall, the smoothness of the inner pipe wall (defects in surface), and the eccentricity of the pipe (which may not be zero). The inner wall smoothness and eccentricity of the pipe are difficult to determine in the field and can drastically affect the accuracy of clamp-on ultrasonic flow meters.

Clamp-on transducers require a silicon grease (or similar substance) between the outer pipe wall and the bottom of the transducer to fill and eliminate any air gaps. This grease needs to be replaced periodically, especially in outdoor or dry locations, leading to increased maintenance requirements.

Due to the number of installation details needed for a successful installation of clamp-on ultrasonic transducers, successful installation may not occur in every situation. Additionally, clamp-on transducers are susceptible to being unintentionally moved by external forces, such as a passers-by knocking or hitting transducers by mistake. Any shift in the clamp-on transducer can jeopardize the flow measurement accuracy.

Installing clamp-on transducers can often frustrate an installer that is new to this type of technology. Even for those familiar with the process, properly addressing the plumbing details required for installation can be difficult, resulting in prolonged installation time periods.

In some aspects, an ultrasonic flow rate measure device includes a transducer body having a first end and a second end, a cylindrical flow passage through the body connecting the first end and the second end, a mounting space within the body separated from and parallel to the cylindrical passage, at least one track in the mounting space, and at least one transducer chassis coupled to the at least one track, the at least one transducer chassis having a piezo member oriented at an angle to a centerline of the cylindrical passage. At least one attachment structure may be connected to one or more of the first end and the second end of the transducer housing, the at least one attachment structure having an attachment portion configured to engage with at least one pipe. The at least one transducer chassis may be configured to be slidable along the track.

In another aspect, an ultrasonic transducer assembly for measuring fluid flow through a pipe include a transducer body having a first end and a second end, a first side wall extending between the first end and the second end, a second side wall extending between the first end and the second end, a top wall extending between the first end and the second end, a cylindrical passage through the body connecting the first end and the second end, and at least one track parallel to the cylindrical flow passage. At least one transducer chassis may be removably coupled to the at least one track, the at least one transducer chassis having a hollowed-out portion and at least one piezo member mounted within the hollowed-out portion such that an angle between the piezo member and a centerline of the cylindrical passage is less than 90 degrees. A cover may be configured to create a water-tight seal around the mounting space.

In yet another aspect, an ultrasonic transducer assembly includes a transducer body having a first end and a second end, a first side wall extending between the first end and the second end, a second side wall extending between the first end and the second end, a top wall extending between the first end and the second end, a cylindrical passage through the body connecting the first end and the second end, and at least one track parallel to the cylindrical flow passage. The assembly may also include a first transducer chassis removably coupled to the at least one track, the first transducer chassis having a hollowed-out portion and at least one piezo member mounted within the hollowed-out portion such that an angle between the piezo member and a centerline of the cylindrical passage is less than 90 degrees, a second transducer chassis removable coupled to the at least one track, the second transducer chassis having a hollowed-out portion and at least on piezo member mounted within the hollowed-out portion such that an angle between the piezo member and a centerline of the cylindrical passage is less than 90 degrees, and a cover configured to create a water-tight seal around the mounting space. The first transducer chassis and the second transducer chassis are spaced apart a predetermine distance such that an ultrasonic signal emitted from the piezo member of one of the first or second transducer chasses is reflected off a wall of the cylindrical passage and received by the other of the first or second transducer chasses.

BRIEF DESCRIPTION OF THE DRAWINGS

Various embodiments are depicted in the accompanying drawings for illustrative purposes, and should in no way be interpreted as limiting the scope of the disclosure, in which like reference characters denote corresponding features consistently throughout similar embodiments.

FIG. 2 illustrates a side view of the inline transducer chassis of FIG. 1.

FIG. 3 illustrates a cross-sectional view of the transducer chassis of FIG. 2.

FIG. 8 illustrates a side view of a transducer chassis, according to one embodiment.

FIG. 9 illustrates a cross-sectional view of the transducer chassis of FIG. 8.

FIG. 10 illustrates a second cross-sectional view of the transducer chassis of FIG. 8.

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein.

Ultrasonic transducer assemblies are used to measure flow characteristics of fluid flowing through pipes or other fluid lines. The transducer assemblies can include two or more transducers configured to send and receive ultrasonic signals through the fluid line and corresponding fluid. Transducer assemblies can indicate such parameters as the velocity of the fluid through the fluid line. Transducer assemblies can be used in conjunction with pumps and other devices to monitor and/or control flow rates through fluid lines.

The transducers used in the transducer assemblies often must be precisely aligned with the longitudinal axis of the fluid line on which they are installed. Misalignment of the transducers can increase the likelihood that the ultrasonic signals sent from the first transducer will not be received by the second transducer.

Inline type ultrasonic flow meters can reduce installation time and improve flow measurement accuracy since several difficult to determine variables necessary for a successful installation may be removed. For example, when installing an inline type ultrasonic flow meter, the pipe material composition and sound speed through the pipe material is known and controlled by the manufacturer. Furthermore, the pipe inside diameter is known and controlled. Additionally, the eccentricity of the inside diameter may be held at zero. The manufacturer may also control the pipe wall thickness, the installation of the transducers, transducer separation distance, etc.

Furthermore, some embodiments of an inline flow meter can reduce inventory holding cost. Since the annular diameter of the flow passage of the inline flow meter can be controlled at the time of manufacture, several models with varying annular diameters can be made. External pipes of varying diameters may be connected to each model of the inline flow meter. Therefore, in some embodiments, an inline flow meter having a given diameter may be used with a range of pipe diameters, as will be discussed in further detail below. This reduces the amount of inventory required while also improving the measuring accuracy, due to the other variables, identified above, that may be controlled during manufacture of the flow meter.

Figure 1:
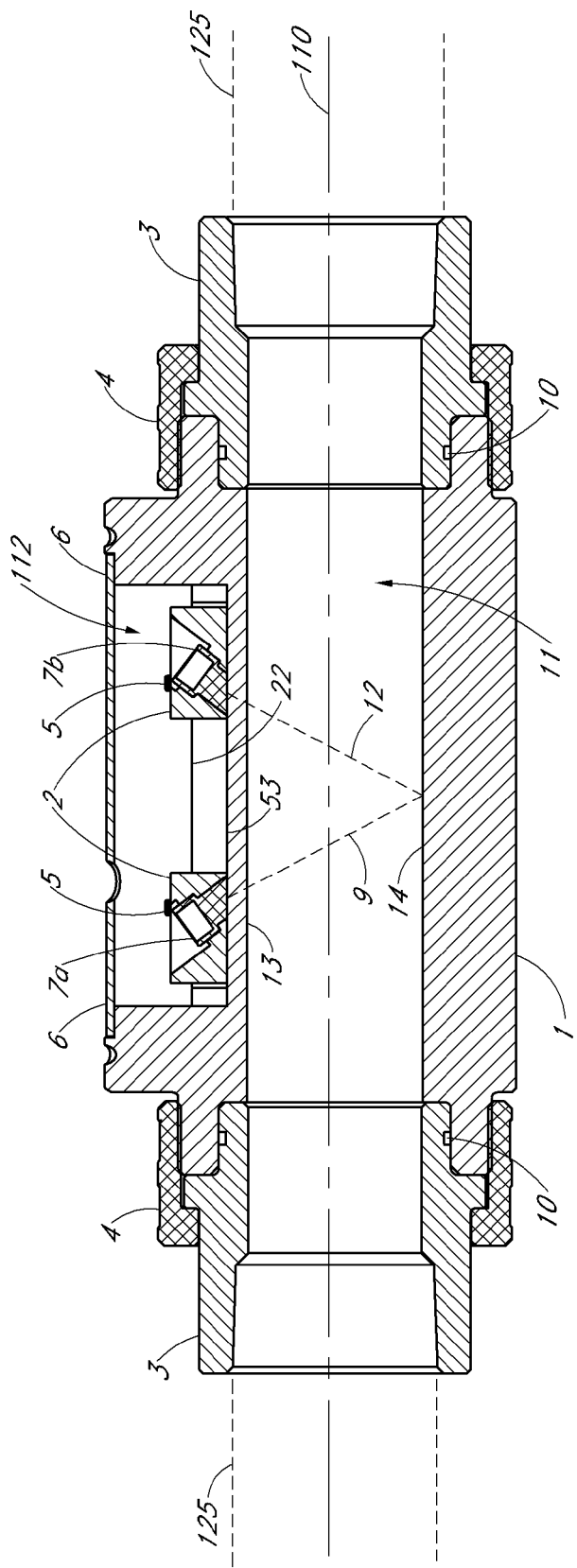
FIG. 1 illustrates a vertical cross-sectional view of an inline transducer chassis implementing a V-beam measuring strategy, according to one embodiment.

In some embodiments, such as that shown in FIG. 1, an inline ultrasonic transducer assembly 100 may include a transducer chassis 2 mounted on at least one rail 22. The transducer chassis 2 having one or more transducers may be coupled to a machined, molded, or extruded body or housing 1 with pipe interface members 3 secured to either end of the body 1. The body may have a central flow passage 11 defined by an annular wall 13. Fluid or gas may flow from one end of the body to the other (or from left to right or right to left, as shown in FIG. 1) through the flow passage 11. External pipe 125 may be connected to the pipe interface members 3 such that fluid or gas may flow through the flow passage 11 in the body 1 from a liquid or gas source. The transducer chassis 2 may be mounted within an opening 112 in the body 1 along a section of the body 1 having a uniform cross section such that the transducer chassis 2 is substantially parallel to the centerline 110 of the flow passage 11. A stainless steel water tight cover 6 may be installed over the opening 112 in the body 1 to protect the transducer chassis 2 from damage.

As shown in FIGS. 1 and 2, located on one or multiple sides of the body 1 and part of the transducer assembly 100 is a transducer track 8, used to align and hold two or more transducer chassis 2 in place. The transducer track 8 may be defined as two or more parallel rails 22 and the space between the parallel rails 22, as will be discussed in greater detail below. However, in other embodiments, the track 8 may be defined by a single rail 22. In one embodiment, two transducer chassis 2 may be attached to the track 8. As shown in FIGS. 1 and 2, the transducer chassis 2 may be mounted to the track 8 using at least one fastener 5 that may be any type of mechanical fastening device such as a screw, nail, bolt, etc. The fastener 5 may allow some movement or play of the transducer housing on the rails 22. Furthermore, the fastener 5 allows the distance between the transducer chassis 2 to be adjusted depending on the fluid to be measured, etc. in order to maximize measurement accuracy.

Figure 11B:
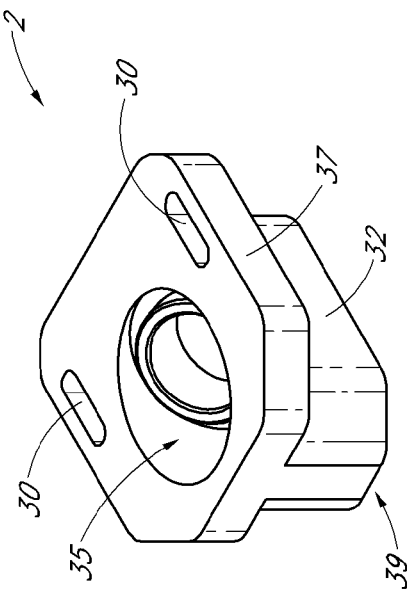
FIG. 11A-D illustrate top, side perspective, front, and right views of a transducer housing according to one embodiment.
Figure 11D:
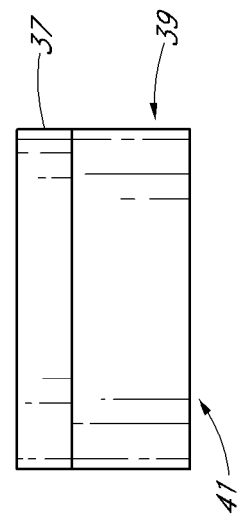
Figure 11A:
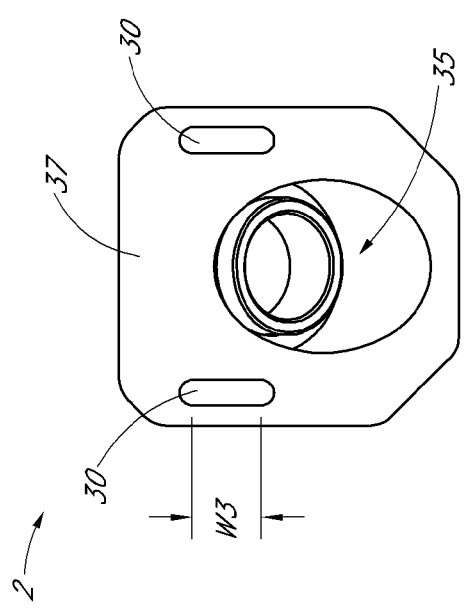
Figure 11C:
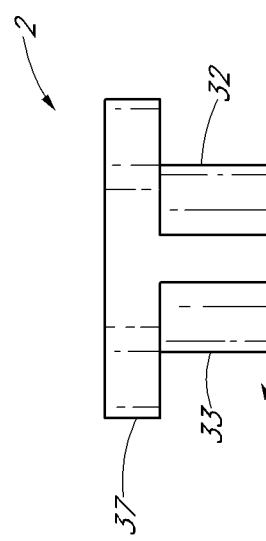

In some embodiments, when a diameter of the flow passage 11 is determined at the time of manufacturing the body 1, holes may be predrilled in the rails 22 at the approximate location for each transducer chassis 2, establishing the approximate distance between the transducer chassis 2 to enable accurate ultrasonic measurement of the flow through the passage 11. Upon installation of the transducer chassis 2, slight adjustment to the longitudinal position of the transducer chassis 2, or the distance between the transducer chassis 2, may be made using the slots 30, permitting the width of each transducer to be adjusted by an amount W3 substantially equal to the length of the slots 30, as shown in FIG. 2 and FIGS. 11A and B. Coupling the transducer chassis 2 to the track 8 using mechanical fasteners 5 prevents angular rotation of the transducer chassis 2 with respect to the centerline 110 of the flow passage 11, enabling more accurate measurement and reduced maintenance expense.

Each transducer chassis 2 may have a transducer 7a, 7b mounted within a pocket 35 of the transducer chassis 2, as best illustrated in FIGS. 11A and B. As shown in FIG. 1 and FIGS. 11A and B, two transducers, 7a and 7b, are mounted within the two transducer chassis 2 such that the transducer 7a is mounted within one transducer chassis 2 and the transducer 7*b* is mounted within another transducer chassis 2. Each transducer chassis 2 has two parallel side walls 32 and 33 set at a fixed, pre-determined width such that the transducer chassis 2 can fit between the rails 22 of the track 8. The parallel side walls 32, 33 of the transducer chassis 2 along with the parallel transducer guide walls of the body 1 enable the transducers 7*a*, 7*b* to slide freely along the same axis, parallel to the centerline 110 through the body 1, through which the fluid or gas flows. In other embodiments, not shown, other transducer chassis 2 and track 8 configurations may include a single rail such that the transducer chassis 2 is configured to wrap around the single rail of the track.

Figure 12:
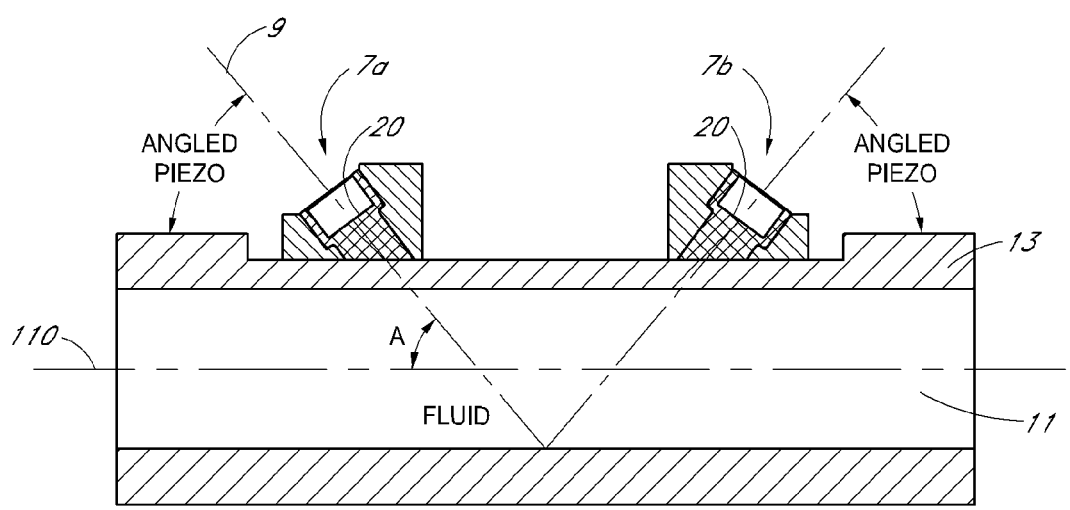
FIG. 12 illustrates a transducer chassis implementing a V-beam measuring strategy according to another embodiment.

As shown in FIG. 3, the transducer 7*a* includes a piezo member 20. Similarly, transducer 7*b* also includes a piezo member 20. The transducers 7*a*, 7*b*, and therefore, the piezo members 20, may be angled such that they can be used to measure the flow characteristics of fluid within a pipe connected to pipe fittings 3. In some embodiments, a V-beam measuring technique is used. In some such embodiments, as shown in FIG. 12, a signal 9 is emitted from one transducer 7*a*, passed through the annular wall 13 of the flow passage 11 in the body 1 and through the fluid within the flow passage 11, reflected off of the wall 13 of the flow passage, and received by the other transducer 7*b* installed on the same side of the flow passage 11.

As shown in FIGS. 1-4 and 11A-D, the transducer chassis 2 may be attached to the rails 22 using mechanical fasteners 5. A small distance W2 may be provided between a surrounding flange 37 of the transducer chassis 2 and the rails 22 to ensure that the bottom 41 of the transducer chassis 2 is flush against the track floor 53. The distance shown as W1 indicates the smallest width between the bottom of the transducer chassis 2 and the annular wall 13, or the minimum pipe wall thickness. This dimension is one variable affecting ultrasonic flow measurement that may be controlled at the time of manufacture of the transducer assembly 100, as discussed above.

In some embodiments, the separation distance between the two transducer chassis 2 will be constant. In some embodiments, this separation distance is established at the time of manufacture of the transducer assembly 100, and depends on variables such as the diameter of the flow passage, the thickness of the annular wall 13, etc. However, as discussed above and as shown in FIG. 2, slight changes in the separation distance may be made upon installation of the transducer assembly 100 within a piping system by adjusting the fasteners 5 within the slots W3 to accommodate certain conditions, such as fluid type, etc. In some embodiments, calibration changes to the separation distance between the transducers may be made at the time the transducer chassis 2 is assembled with the body 1 or at the time the transducer assembly 100 is installed within a piping system.

For different diameters of flow passage 11, predrilled holes may be made in the rails 22 for attachment of the transducer chassis 2 at various separation distances, such as at least 0.5 inch, at least 1 inch, at least 1.5 inches, at least 2 inches, or at least 3 inches. Therefore, the transducer mounting area 12 within the body may have similar dimensions among the various models of transducer assembly 100 having varying flow passage 11 diameters and similar track 8 and rail 22 designs may also be used. Furthermore, as discussed above, different models of the transducer assembly 100 can share the same overall design and dimensions, regardless of the diameter of the internal flow passage 11 and the diameter of the pipe interface members 3. This minimizes inventory, reduces inventory management, and lowers costs.

A side view of the transducer assembly 100 illustrating the two transducer chassis 2 mounted within an opening 12 in the body 1 is shown in FIG. 2. In the illustrated embodiment, the two transducer chassis 2 are mounted to two rails 22 using fasteners 5. As shown, two fasteners 5 are used to secure each transducer chassis 2 to the rails 22. However, in other embodiments, 1, 3, 5, or 6 fasteners may be used to attach each transducer chassis 2 to the tracks 8. As discussed above, some adjustment or play using slot W3 may be allowed between the fasteners 5 and the chassis 2 to allow the separation distance between the two transducer chassis 2 to be adjusted to accommodate the type of fluid to be measured or other small adjustments. A nut 4 may be provided to secure the pipe interface members 3 to the body 1. The nut 4 and the pipe interface members 3 may be selected depending on the type of input and output pipes to be connected to the body 1 or the source of fluid to be measured by the transducer assembly.

FIG. 3 illustrates a cross-sectional view of the transducer chassis 2 along line B-B, as shown in FIG. 2. The transducer chassis 2 includes a hollowed-out portion in which a piezo member 20 is mounted (see FIG. 12). This hollowed-out portion or pocket may be better viewed in FIGS. 11A and B. The hollowed-out portion allows the piezo member to 20 to be oriented at an angle with respect to the centerline 110 of the flow passage 11, as will be discussed in greater detail below. The piezo member 20 is desirably oriented at an angle to the centerline 110 of the flow passage 11 of the body 1 such that measuring strategies such as the V-beam measuring strategy discussed above may be implemented using the piezo member 20. The piezo member 20 may be a disc shaped member that may be mounted flat against a mounting surface 27 (FIG. 9) of the transducer chassis 2 such that the piezo member 20 is disposed below a top surface of the chassis 2 at an angle to the centerline 110. As shown in FIG. 12, the piezo member 20 is angled at approximately a 45 degree angle A to the centerline 110. In some embodiments, the piezo member 20 may be angled at least 20 degrees from the centerline 110, at least 25 degrees from the centerline 110, at least 30 degrees from the centerline 110, at least 35 degrees from the centerline 110, or at least 40 degrees from the centerline. A silicone gel or other gel-like material that may be used within a transducer assembly may be used to fill in any air gaps between the piezo member 20 and the transducer chassis 2. Furthermore, a silicone gel or other gel-like material that may be used within a transducer assembly may be used to fill in any air gaps between each transducer chassis 2 and the track floor 53 and or the rails 22.

Figure 4:
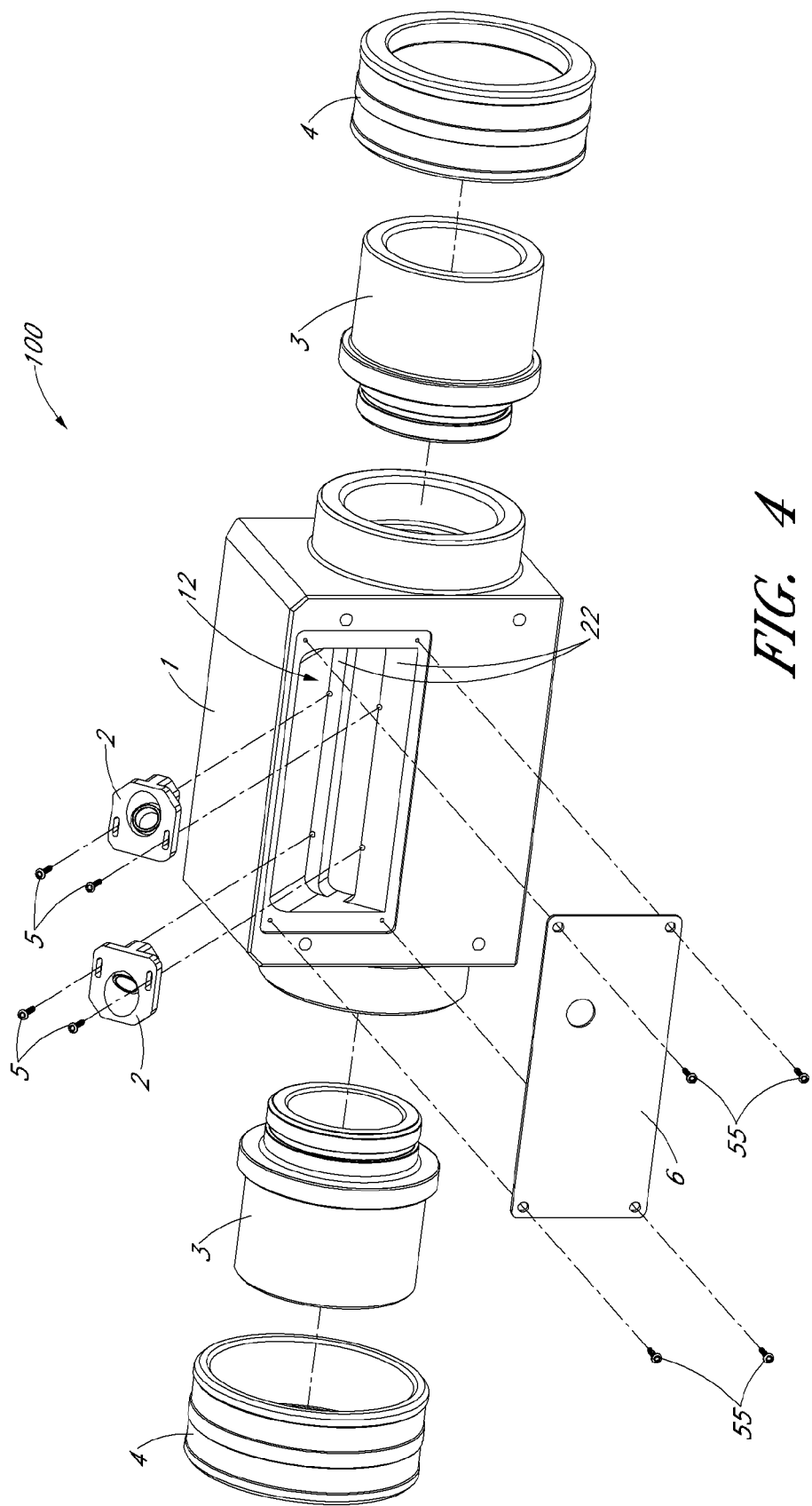
FIG. 4 illustrates an exploded perspective view of the transducer chassis of FIG. 1.
Figure 5:
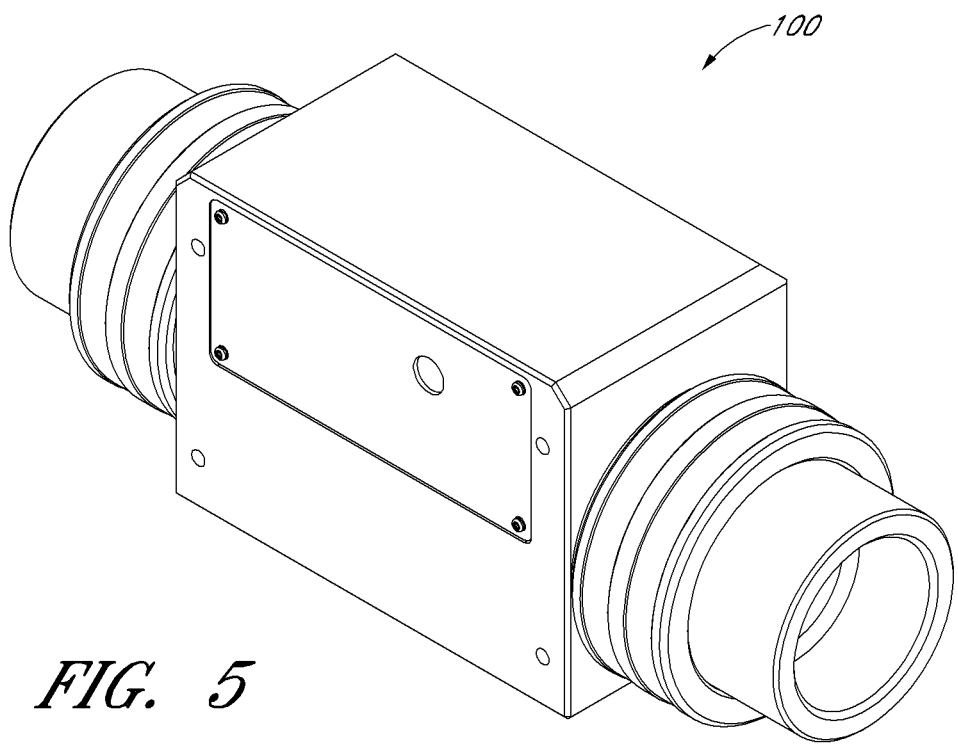
FIG. 5 illustrates a side perspective view of the transducer chassis of FIG. 1.

An exploded perspective view of the transducer assembly 100 is illustrated in FIG. 4. As discussed above, each transducer chassis 2 may be connected to one or more rails 22 mounted within an opening 12 in the body 1 by fasteners 5. The opening 12 within the body 1 may be sealed from the outside environment using the removable cover 6. The cover may be fastened to the body 1 by any type of mechanical fastener 55 such as screws, bolts, nails, etc. A pipe interface member 3 may be attached to either end of the body 1 to allow for connection with input and output pipes (not shown). The nuts 4 may be used to secure the pipe interface members 3 to the body 1. As discussed in greater detail above, the transducer chassis 2 may be adjustable along the rails 22 depending on the characteristics of the flow to be measured, such as the type of fluid, etc. FIG. 5 illustrates a fully assembled transducer assembly 100 with the cover 6 and pipe interface members 3 attached.

Figure 6:
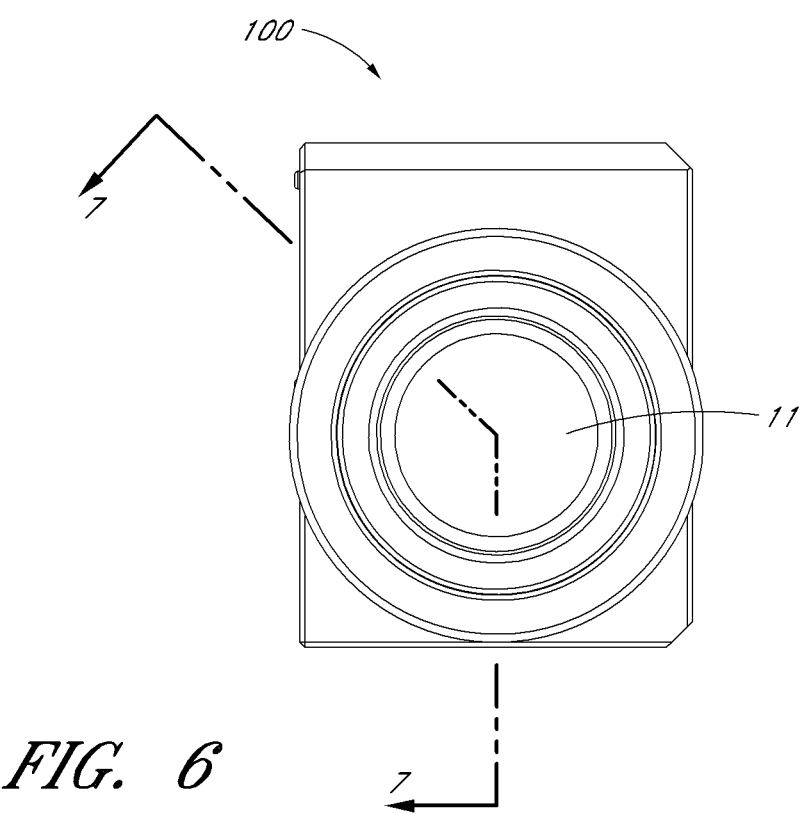
FIG. 6 illustrates a view of the transducer chassis of FIG. 1 as viewed from one end of the chassis.
Figure 7:
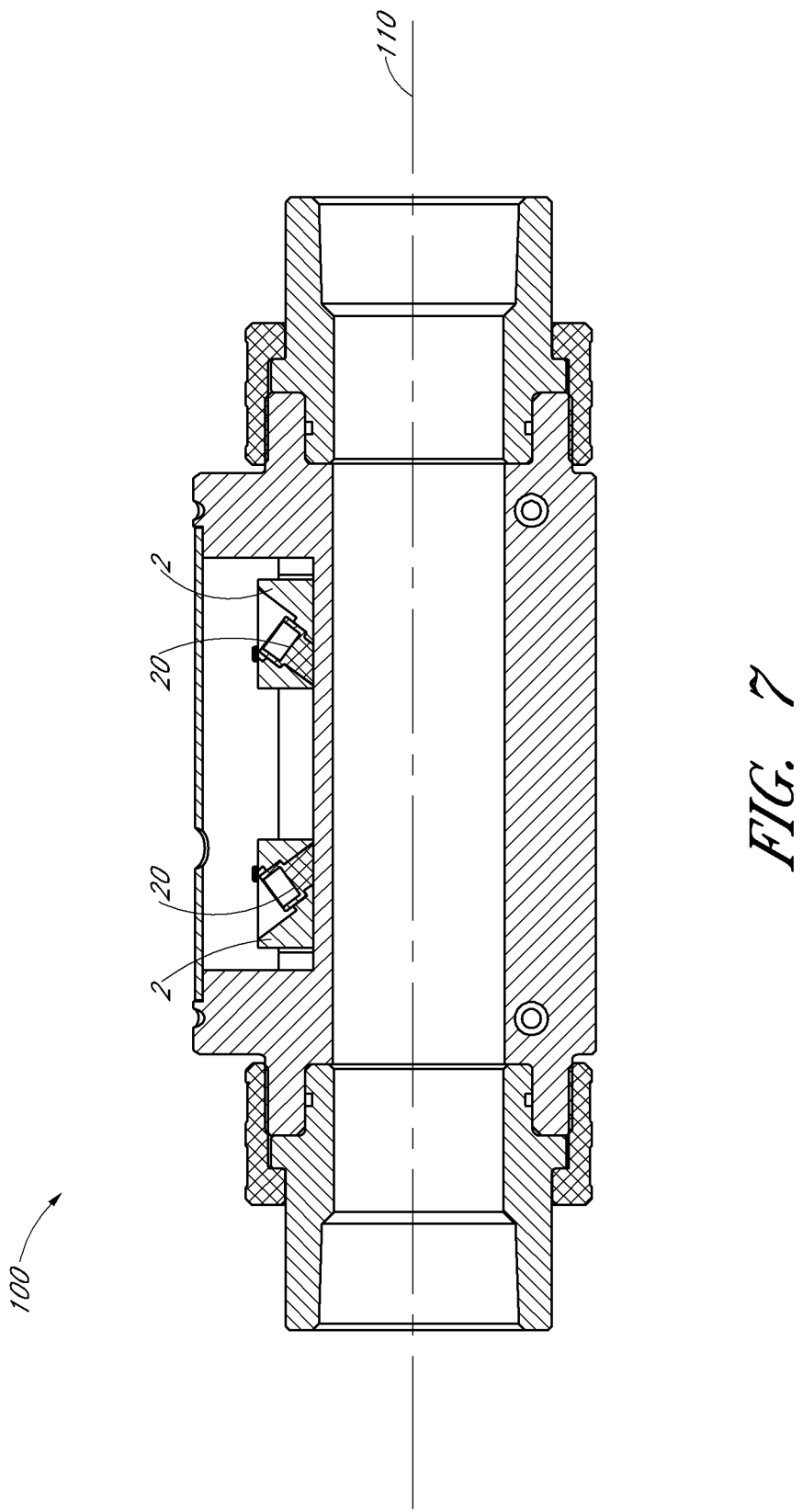
FIG. 7 illustrates a cross-sectional view of the transducer chassis of FIG. 6.

An end view of the transducer assembly 100 is shown in FIG. 6. FIG. 6 may be a view from either end of the transducer assembly 100. As shown, a flow passage 11 passes through the assembly 100 to allow flow to pass through from one end of the assembly 100 to the other. A cross-sectional view along line 7 shown in FIG. 6 is illustrated in FIG. 7. As discussed above, each transducer chassis 2 incorporates a piezo member 20 that is angled from the centerline 110 of the flow passage 11 to allow measuring strategies such as a V-beam measuring strategy to be implemented.

FIG. 8 illustrates a view of the transducer assembly 100 with the cover removed such that the transducer chassis 2 and the rails 22 are visible. In this configuration, adjustments to the separation distance between the transducer chassis 2 may be made at the location where the transducer assembly is installed, such as within a piping system. FIGS. 9 and 10 illustrate cross-sectional views taken along the lines 9 and 10 shown in FIG. 8. FIGS. 9 and 10 illustrate cross-sectional views through the transducer chassis 2 similar to the cross-sectional view shown in FIG. 3 and discussed above.

Four views of the transducer chassis 2 are illustrated in FIGS. 11A-D. As best seen in FIGS. 11A and B, the transducer chassis 2 has a hollowed-out section or pocket 35 configured such that the piezo member 20 may be installed flat against the angled interior surface of the pocket 35 within the transducer chassis 2. The piezo member 20 is located within the pocket 35 such that it is disposed below a top surface of the chassis 2. The piezo member 20 may be easily removed or replaced from the transducer chassis 2 in case of malfunction. In some embodiments, the transducer chassis has at least one slot 30 that may be used to receive a fastening device, such as fastener 5 shown in FIGS. 1, 2, and 4, to couple the transducer chassis 2 to the track or tracks 8. The slot 30 may have a width W3 to allow a small adjustment of the transducer chassis 8 along the track 8 parallel to the centerline of the flow passage 11.

The angle of the piezo member 20 with respect to the centerline of the flow passage 11 is illustrated in FIG. 12. As discussed above, the angle of the piezo member 20 with respect to the centerline 110 may vary depending on the type of fluid to be measured and other flow measurement variables, including the properties of the annular walls 13 surrounding the flow passage 11 and other variables. A V-beam measuring strategy is shown, similar to that described above with respect to FIG. 1; however, other measuring strategies such as W-beam or Z-beam measuring strategies may be implemented using the transducers of the transducer assembly 100.

Although the transducer assembly installation device and methods have been disclosed in the context of certain preferred embodiments and examples, it will be understood by those skilled in the art that the present disclosure extends beyond the specifically disclosed embodiments to other alternative embodiments and/or uses of the disclosed devices and methods and obvious modifications and equivalents thereof. In addition, while a number of variations of the devices and methods have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. Accordingly, it should be understood that various features and aspects of the disclosed embodiments can be combined with or substituted for one another in order to form varying modes of the disclosed devices and methods. Thus, it is intended that the scope of the present disclosure should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. An ultrasonic flow rate measuring device comprising:
   a transducer body having:
      a first end and a second end,
      a wall defining a cylindrical flow passage through the body connecting the first end and the second end, said cylindrical passage defining an axis,
      a mounting space within the body separated from and parallel to the cylindrical passage,
      at least one track in the mounting space, and
      at least one transducer chassis coupled to the at least one track, the at least one transducer chassis having a piezo member oriented at an angle to a centerline of the cylindrical passage;
   at least one attachment structure connected to one or more of the first end and the second end of the transducer body, the at least one attachment structure having an attachment portion configured to engage with at least one pipe such that the axis of the cylindrical passage will be aligned with an axis of the at least one pipe;
   wherein the at least one transducer chassis is configured to be slidable along the track, so that an ultrasonic signal emitted from the piezo member of the at least one transducer chassis is reflected off the wall defining the cylindrical passage such that an angle between the piezo member and the axis of the elongate cylindrical passage is less than 90 degrees.

2. The ultrasonic flow rate measuring device of claim 1 wherein the at least one track comprises two parallel rails.

3. The ultrasonic flow rate measuring device of claim 1 wherein the at least one track comprises a single rail.

4. The ultrasonic flow rate measuring device of claim 1 further comprising two transducer chassis configured to be slidable along the at least one track.

5. The ultrasonic flow rate measuring device of claim 1 wherein the at least one transducer chassis is oriented substantially parallel to the axis of the flow passage.

6. The ultrasonic flow rate measuring device of claim 2, wherein the at least one transducer chassis further comprises two parallel side walls set at a fixed, pre-determined width such that the transducer chassis can fit between the two parallel rails of the track.

7. The ultrasonic flow rate measuring device of claim 3, wherein the at least one transducer chassis is configured to wrap around the single rail of the track.

8. The ultrasonic flow rate measuring device of claim 4, wherein a separation distance between the two transducer chassis is kept constant by attaching the two transducer chasses to predrilled holes in the parallel rails.

9. The ultrasonic flow rate measuring device of claim 8, wherein the separation distance between the two transducer chasses is adjustable by adjusting fasteners within slots located on each transducer chassis.

10. An ultrasonic transducer assembly for measuring fluid flow through a pipe, the transducer assembly comprising:
   a transducer body having:
      a first end and a second end,
      a first side wall extending between the first end and the second end,
      a second side wall extending between the first end and the second end,
      a top wall extending between the first end and the second end,
      a third wall defining an elongate cylindrical passage through the body connecting the first end and the second end, and
      at least one track parallel to the cylindrical flow passage;

at least one transducer chassis removably coupled to the at least one track, the at least one transducer chassis having a hollowed-out portion and at least one piezo member mounted within the hollowed-out portion such that an angle between the piezo member and a centerline of the elongate cylindrical passage is less than 90 degrees; and a cover configured to create a water-tight seal around the mounting space.

11. The ultrasonic transducer assembly of claim 10, wherein the track comprises two parallel rails such that the at least one transducer chassis is configured to slide along the rails.

12. The ultrasonic transducer assembly of claim 10, wherein the at least one track comprises a single rail such that the at least one transducer chassis is configured to slide along the rail.

13. The ultrasonic transducer assembly of claim 11 further comprising two transducer chasses configured to be slidable along the at least one track.

14. The ultrasonic transducer assembly of claim 10 wherein the at least one transducer chassis is oriented substantially parallel to the centerline of the flow passage.

15. The ultrasonic flow rate measuring device of claim 13, wherein a separation distance between the two transducer chasses is kept constant by attaching the two transducer chasses to predrilled holes in the parallel rails.

16. The ultrasonic flow rate measuring device of claim 15, wherein the separation distance between the two transducer chasses is adjustable by adjusting fasteners within slots located on each transducer chassis.

17. An ultrasonic transducer assembly, comprising:
a transducer body having:
a first end and a second end,
a first side wall extending between the first end and the second end,
a second side wall extending between the first end and the second end,
a top wall extending between the first end and the second end,
a cylindrical wall defining a cylindrical passage through the body connecting the first end and the second end, and
at least one track parallel to the cylindrical flow passage;
a first transducer chassis removably coupled to the at least one track, the first transducer chassis having a hollowed-out portion and at least one piezo member mounted within the hollowed-out portion such that an angle between the piezo member and a centerline of the cylindrical passage is less than 90 degrees;
a second transducer chassis removable coupled to the at least one track, the second transducer chassis having a hollowed-out portion and at least on piezo member mounted within the hollowed-out portion such that an angle between the piezo member and a centerline of the cylindrical passage is less than 90 degrees; and
a cover configured to create a water-tight seal around the mounting space;
wherein the first transducer chassis and the second transducer chassis are positionable a predetermined distance apart such that an ultrasonic signal emitted from the piezo member of one of the first or second transducer chasses is reflected off the cylindrical wall defining the cylindrical passage and received by the other of the first or second transducer chasses.

18. The ultrasonic transducer assembly of claim 17 wherein the first and second transducer chasses are slideable along the track.

19. The ultrasonic transducer assembly of claim 17 wherein a separation distance between the first transducer chassis and the second transducer chassis is adjustable.

* * * * *